United States Patent [19]

Wolters et al.

[11] Patent Number: 5,732,658
[45] Date of Patent: Mar. 31, 1998

[54] STABLE PROVIDED WITH MANURE COLLECTION PIT WITH V-SHAPED BOTTOM, AND METHOD FOR REDUCING AMMONIA EMISSION

[75] Inventors: Johannus Stephanus Josephus Wolters, Zwolle; Jozef Willibrordus Maria Wolbrink, Hengelo, both of Netherlands

[73] Assignee: Wolters Holding B.V., Zwolle, Netherlands

[21] Appl. No.: 640,811

[22] PCT Filed: Nov. 8, 1994

[86] PCT No.: PCT/NL94/00278

§ 371 Date: May 8, 1996

§ 102(e) Date: May 8, 1996

[87] PCT Pub. No.: WO95/12971

PCT Pub. Date: May 18, 1995

[30] Foreign Application Priority Data

Nov. 9, 1993 [NL] Netherlands .......... 93 01 938
Mar. 23, 1994 [NL] Netherlands .......... 94 00 463

[51] Int. Cl.⁶ ..................................... A01K 1/01
[52] U.S. Cl. .............. 119/450; 119/447; 119/527

[58] Field of Search .................... 119/447, 450, 119/527

[56] References Cited

U.S. PATENT DOCUMENTS

| 428,848 | 5/1890 | Logan | 119/527 |
| 2,868,169 | 1/1959 | Schriever et al. | 119/450 |
| 3,848,568 | 11/1974 | Hazen et al. | 119/527 |
| 4,520,759 | 6/1985 | Deters | 119/447 |

*Primary Examiner*—Robert P. Swiatek
*Attorney, Agent, or Firm*—Edmund M. Jaskiewicz

[57] ABSTRACT

Stable (1) comprising a collection chamber (6) with a bottom (7) below a stable grid. The bottom (7) is covered by a bottom plate (9) formed by parallel V-shaped gutters (10). The walls of the gutters (10) form an angle with the horizontal, which is between 45 degees and 80 degees. At the underside the gutters (10) have a radius of 7 to 12 cm. Method for flushing a stable, manure being collected in V-shaped gutters (10), after which the bottom is flushed. The manure is discharged to a storage facility. After a certain settling time the manure has separated into a thick fraction and a thin fraction. The in fraction is drawn off and is used to flush the bottom plate clean. A layer of the thin fraction remains standing on the bottom plate (9), so that the manure is collected therein.

10 Claims, 6 Drawing Sheets

STABLE PROVIDED WITH MANURE COLLECTION PIT WITH V-SHAPED BOTTOM, AND METHOD FOR REDUCING AMMONIA EMISSION

The invention relates to a stable comprising a floor provided with an outlet for manure and urine to a collection chamber or pit situated below a stable grid, which collection chamber is provided with a bottom which is composed of, or covered by, a number of gutters placed parallel to one another and each having two substantially straight side walls, a bottom surface and an open top end, the gutters forming a bottom plate which covers the entire bottom of the pit. The invention also relates to an improved method for flushing the stable with the thin fraction of the manure.

A stable having such a floor for the shallow pit is known, for example, from the American Patent U.S. Pat. No. 4,520,759. The bottom of the stable shown is provided with grids underneath which bottom sections are disposed, which bottom sections are shaped in such a way that a number of gutters positioned parallel to one another have been produced. The purpose of the gutters is to drain the urine and manure to a storage tank or slurry pit. The bottom of the gutters is positioned so as to be slightly sloping in order to facilitate drainage. Between the gutters there are ribs which serve to be able to support the grids placed across the gutters. These grids form the floor of the stable, across which the livestock can walk.

A drawback of this known stable is that manure can easily remain between the grids and the top edge of the support ribs; moreover, the urine or thin fraction of the manure can leak through between the seams formed mutually by the bottom elements and the walls of the pit and the bottom elements to the chamber underneath the gutters. As a result, the subsoil of the pit will become polluted, most certainly if no floor is fitted under the floor sections, or a floor whose thickness is insufficient.

Generally known are stables for livestock, such as pigs, cows etc., in which the manure and slurry are collected for example, shallow pits. At regular intervals, for example twice a day, these shallow pits are then flushed clean, and the manure and the slurry are stored for subsequent spreading, after a certain time, over the farmland. As the raising of livestock is carried out more and more intensively, more and more manure and slurry are being produced. It has been found that this results in strong acidification of the environment and of nature. Acidification is promoted by nitrogen and sulphur compounds, of which ammonia is one. Consequently, methods have now been developed for reducing the acidification which occurs as result of, inter alia, the ammonia emission from the manure. Manure flushing systems have therefore been developed, by means of which the ammonia emission can be considerably abated.

One of these known systems comprises the manure produced in the stable being discharged to a settling silo or pit, the thin and the thick fraction of the manure after a certain settling time then being separated from one another, and the thin fraction then being used for flushing the stable clean, while the thick fraction goes to a storage silo and is stored for subsequent further processing. This method achieves a considerable abatement of the ammonia emission to the ambient air. As a result of separation of the manure, a much thinner thin fraction remains which can be evaporated in a simple and inexpensive manner, so that the total volume of manure can be reduced by approximately 50%. Previously, the thin fraction was spread as slurry over the farmland, which strongly promoted acidification.

The purpose of the invention is a stable in which facilities are provided by which the ammonia emission in the case of livestock being kept in the stable is reduced yet further, as well as a purpose for fitting these facilities.

The object of the invention is achieved by a stable provided with a pit in accordance with the type described in the preamble, in that the gutters are V-shaped, having their side walls making an angle with each other, such that the bottom surface of the gutter is narrowed with regard to the gutter's open top end, the respective gutters adjoining each other at the tops of the respective side walls.

By using the gutters according to the invention, the ammonia evaporation in the stable can be strongly reduced, because the urine and the manure collect in the bottommost part of each V-shaped gutter, as result of which the evaporation surface of the urine and the manure is much smaller than the surface of the bottom covered by the bottom plate.

Although the use of gutters should be regarded as previously known from the American Patent U.S. Pat. No. 4,520,759, these known gutters have the abovementioned drawbacks. Moreover, these gutters are shaped in such a way that no optimum reduction of the evaporation surface of the urine and the manure is obtained. Because the gutters from said American Patent are preferably made of concrete, the gutters do not have smooth walls, so that the manure will adhere to the walls.

In a preferred embodiment, the bottom plate is composed of parts which overlap each other at the ends in the longitudinal direction of the gutter and which are fastened to one another in a leakproof manner, for example by welding or gluing. This measure ensures that the bottom plate can be fitted in a simple manner on the bottom of the collection chamber or on supports, if the collection chamber is a deep pit.

Preferably, the gutters adjoin one another at the tops of the respective side walls with a rounding with a small radius of curvature. Consequently, it will not be possible for any manure to remain lying on the edges between the gutters.

In a preferred embodiment, the walls of the pit are covered with a stretchable plastic film which is attached both to the stable floor or the pit wall for example by being immured, and to the gutters, for example by being glued to or clamped into the edge of the gutter. As a result of the walls of the collection chamber being covered with the film material, they need not be plastered or made resistant to the manure in some other way. The chamber below the bottom plate is sealed by the film in an airtight manner.

It is advantageous for the bottom plate to be made of a weldable, chemically resistant plastic such as high-density polyethylene, HDPE. HDPE is easily welded with simple equipment. As a result, the bottom plate can be constructed, by means of leaktight welded joints, of a plurality of parts and the welded joints can be checked, for example by means of a spark tester. Thus, the bottom plate can be constructed at its intended location in a leaktight and airtight manner from parts which partially overlap in the flushing direction, as a result which the bottom plate can be manufactured, transported, fitted and replaced more easily. It has further been found that HDPE is chemically resistant to the substances contained in the manure. The bottom plate can also be made from a chemically resistant metal such as stainless steel.

Preferably, the bottom plate comprises, at the end facing away from the flushing inlet, a transverse gutter with an outlet. This outlet can be provided with an outlet plug, so that a layer of flushing liquid can remain in the gutters. Instead of an outlet plug it is also possible to use a sewerage system, in which, according to the law of communicating vessels, a layer of flushing liquid remains in the gutters.

By means of this construction, the risk of a not effectively sealable, leaking outlet is restricted.

Preferably, the bottom plate is placed loosely on the floor of the pit, for example on supports, and is positioned so as to be free of the walls, for example by five centimeters, as a result of which the bottom plate, depending on the prevailing temperature, can expand and contract.

Studies have shown that as compact as possible a collection of manure in the bottom of the gutter is generally achieved if the sides of the "V"-shaped gutter are at an angle of 40°–90°. Very good collection in the bottom of the gutter is achieved if the angle is 45°–85°. Maximum compact collection is achieved at an angle of 50°–80°. It should be noted in this context that the angle depends, inter alia, on the type of manure (pig manure, cow manure etc.) and also on the material to be used for the gutter, such as stainless steel and plastics which are corrosion-resistant under these conditions. Thus the manure flows from the sides of the gutter down into the gutter bottom which, for optimum collection and flushing away, has a radius of 5–16 cm. Preferably, the radius is 6–10 cm. Optimum collection and discharge is achieved at a gutter bottom radius of 7–12 cm.

In a preferred embodiment, the bottom is disposed in a leaktight manner and each weld is provided with a thin metal strip, for example an aluminium strip, in order for it to be possible to check the leaktightness after welding.

It was found that this stable, provided with a pit having a bottom plate according to the invention can be used very appropriately in the abovementioned system, the pit being regularly flushed clean with the thin fraction of the manure, after the manure has been separated in a storage silo after a certain time into a thick and a thin fraction.

It has also been found that as a result of these gutters being used in the pits of stables, the abovementioned system or method can be improved yet further. To this end, the method is used according to the system comprising flushing a stable, which stable comprises a floor or grid on which animals can walk, and which walkable grid is provided with drainage holes for the drainage of manure and urine to a collection chamber such as a shallow pit, which is situated below the walkable grid and has a bottom, manure of animals present in the stable being collected in the collection chamber, after which the bottom is regularly flushed with a flushing liquid and the manure, together with the flushing liquid, is then discharged to a storage facility, in which storage facility the manure is separated, after a certain settling time, into a thick fraction and a thin fraction, after which the thin fraction is drawn off and is used as the flushing liquid to flush the bottom plate clean.

Such a method is known from the German Offenlegungsschrift DE-A 26 02 085. This method has the drawback that between two flushings, the emission of ammonia and other gases from the manure and the urine in the collection chamber is very high. The object of the invention is achieved by this method, by the bottom of the collection chamber being covered with a bottom plate consisting of gutters, having a V-shape with two substantially straight side walls making an angle with each other, and in that after flushing a layer of the thin fraction remains standing on the bottom plate, so that the manure is collected therein. This measure ensures that the manure in the gutters is sealed off from the air by the flushing liquid above it, so that the ammonia emission is considerably reduced. The thin fraction may be admixed with an ammonia-binding agent such as an acid, for further reducing the ammonia emission. The ammonia-binding agent, for example an acid, binds the ammonia in the flushing liquid, so that the ammonia emission is lowered yet further.

By means of the arrangement according to the invention it is possible to cause the flushing liquid to flow through the gutter in a wave-like manner towards the outlet, a plurality of waves being possible whose mutual time intervals can be chosen. To this end, the supply means for the flushing liquid comprise a supply pipe for each gutter. In order to enable each gutter to be flushed through independently, it is preferable for each supply pipe to be provided with an independently controllable valve, and for the plug for each gutter to be connected to an independently controllable plug lifter.

The invention will be explained in more detail with reference to the following figures, in which.

Figure 1:
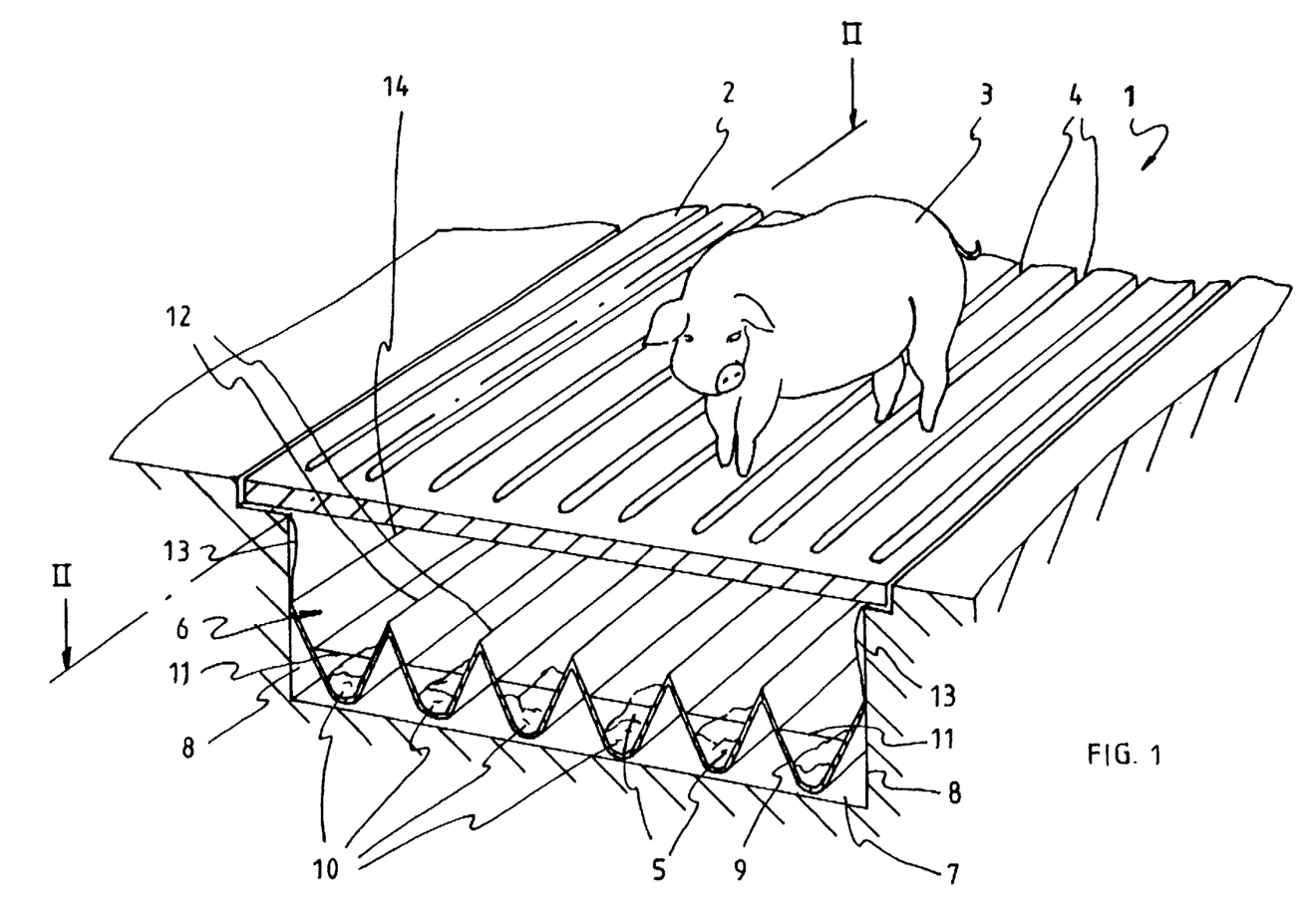
FIG. 1 shows a stable according to the invention in a perspective transverse section.

FIG. 1 shows in perspective transverse section a stable 1 according to the invention, comprising a floor or grid 2 on which animals 3 can walk. The walk able floor 2 is provided with holes 4 through which manure 5 of the animals 3 drops. The manure 5 is collected in a collection chamber 6. This collection chamber 6 has a flat bottom 7 and flat walls 8. The bottom 7 is completely covered by a profiled bottom plate 9. The profiled bottom plate 9 comprises six gutters 10, made, for example, of a plastic or stainless steel, in which the collected manure 5 piles up. Standing in the gutters 10 there is a layer of acidified flushing liquid 11. The upward-pointing ends 12 of the V-shaped gutters 10 are sharp, so that the manure 5 dropping down does not come to rest thereon. The height of the V-shaped gutters 10 is between some 20 and some 60 cm. The walls 8 are covered by a film 13 which is attached at the outer edge 14 of the profiled bottom plate 9.

Figure 2:
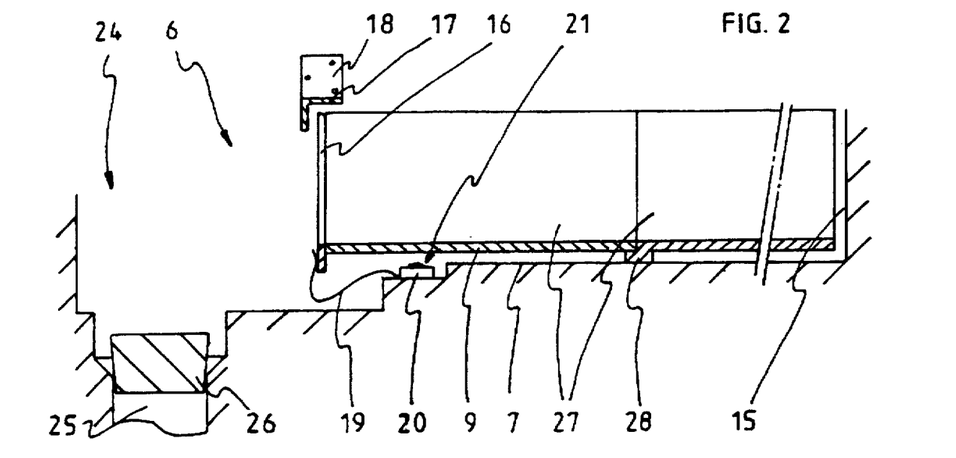
FIG. 2 shows a stable according to FIG. 1 in longitudinal section.

FIG. 2 shows the same stable in longitudinal section on II—II in FIG. 1. The profiled bottom plate 9 lies on the bottom 7 of the collection chamber 6 at a short distance, approximately four centimeters, from the rear wall 15 of the collection chamber 6. At the other end of the profiled bottom plate 9, the space between the bottom 7 of the collection chamber 6 and the profiled bottom plate 9 is covered by a bulkhead 16. At some distance from the bulkhead 16, between the side walls of the collection chamber 6, an angle-section beam 17 is disposed. The beam 17 is attached to the side walls with the aid of attachment means 18. The profiled bottom plate 9 thus lies enclosed between the rear wall 15 and the beam 17. The profiled bottom plate 9 can expand or contract without hindrance as result of temperature variations. On the underside there is permanently glued to the bulkhead 16 a film 19 of, for example, the plastic EPDM. At the other end, the film 19 is glued or attached in some other way to a strip 20 of, for example, stainless steel. Said strip 20 is attached in a recess 21 in the bottom 7 of the collection chamber 6 with the aid of, for example, bolted joints. At the end with the bulkhead, the V-shaped gutters 10 of the profiled bottom plate 9 open into a transverse gutter 24 which is provided with a central outlet hole 25 which can be closed by means of a plug 26. The profiled bottom plate 9 is divided, in the longitudinal direction, into parts or sectional plates 27, which run on underneath one another by a small extension 28. The sectional plates 27 are joined to one another at the extension 28 by means of a welded joint.

The pit in the stable 1 is flushed regularly, for example twice a day, flushing liquid 11 being flushed via an inlet across the profiled bottom plate 9. The flushing liquid 11, together with the manure 5 to be discharged, is discharged via the transverse gutter 24 and the outlet hole 25 to a collection chamber such as, for example, a settling tank. After the pit has been flushed clean, the outlet is closed and a specific amount of acidified flushing liquid is left behind in the gutters, into which the manure can drop.

During a certain settling time the manure separates into a thin fraction and a settled thick fraction. The thin fraction is drawn off after the settling time, and an ammonia-binding substance is added, such as a mixture containing, for example, acetic acid. Preferably, a sufficient amount of this composition is added to the thin fraction for the thin fraction to reach a pH of 6.0 or lower. Owing to the thin fraction— before it is used as the flushing liquid—having been acidified, the layer of flushing liquid which has been left behind on the profiled bottom plate 9 after flushing clean, while the outlet 25 is closed, will still bind, for a certain time, the ammonia in the manure which drops through the floor 2 and is collected in the layer of acidified thin fraction. After some time—preferably when the layer of flushing liquid in the collection gutters has reached a pH of approximately 6.5—the outlet 25 is opened and the bottom plate 9 is again flushed clean with freshly supplied thin fraction, the cycle thus repeating itself.

Figure 3:
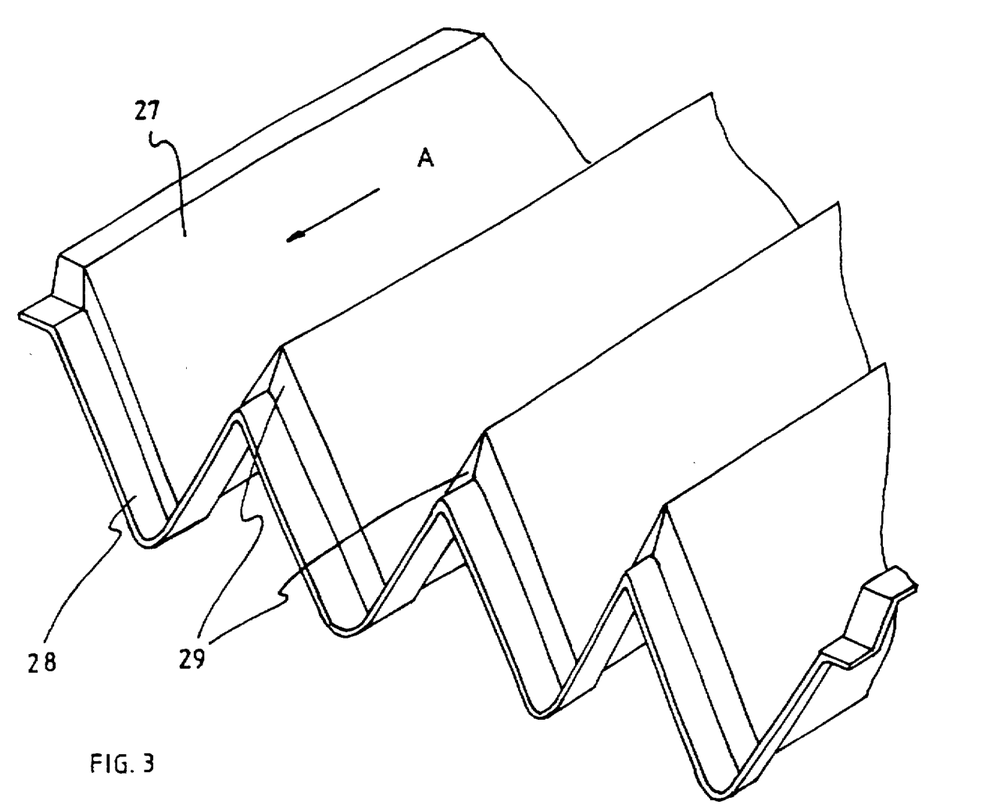
FIG. 3 shows a sectional plate with extension.

FIG. 3 shows the end of a sectional plate 27 which serves as a component for assembling a bottom plate for a stable according to the invention. The arrow A here indicates the flushing direction. The sectional plate 27 is provided at one end with an extension 28 which is situated slightly lower than the upper plane of the bottom plate. The sectional plate 27 is positioned on the bottom of a collection chamber, the extension 28 pointing away from the flushing inlet. The extension 28 of a sectional plate 27 thus runs on in the flushing direction A to below the following sectional plate. The end 29 of the upper plane of the sectional plate 27 is slightly bevelled, a weld thus being produced.

Figure 4:
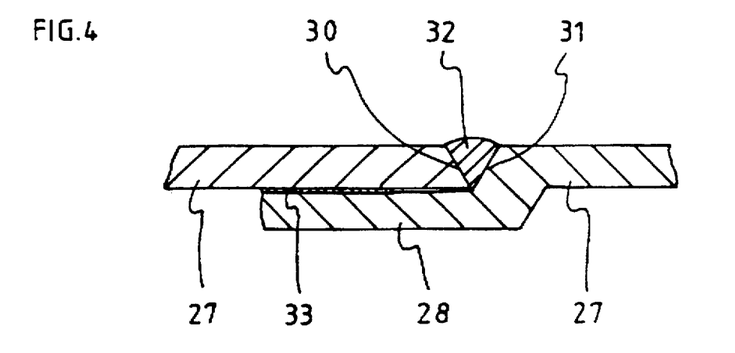
FIG. 4 shows a transverse section of a joint between two sectional plates.

FIG. 4 shows a sectional view of a joint between two sectional plates 27. Owing to the extension 28 being slightly recessed, the upper planes of the sectional plates 27 are flush with one another. Between the bevelled edges 30, 31 there is a weld 32. Between the extension 28 of the sectional plate 27 and the adjoining end of the adjacent sectional plate 27, an aluminium strip 33 is disposed. As a result, the joint can be tested effectively for water-tightness with the aid of a spark tester.

Figure 5:
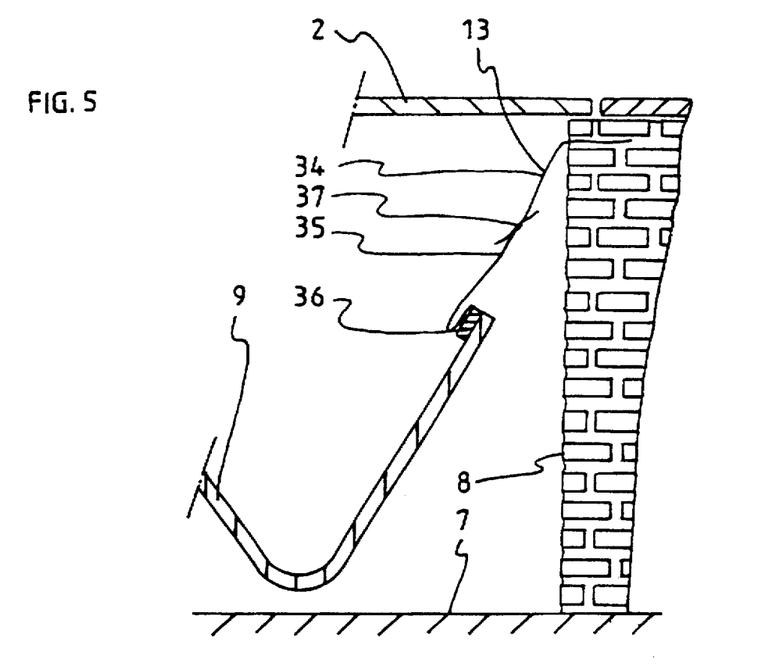
FIG. 5 shows a detail in transverse section of the joint of the bottom plate with the wall.

FIG. 5 shows how the side walls 8 of the collection chamber 6 can be provided with a continuous layer of plastic 13, 34, 35. To this end, a sheet of a particular stretchable plastic film 34 made of, for example, EPDM, which can be stretched up to 400%, is attached in the side wall 8 of the collection chamber 6, for example by immuring. Attached to the edge of the profiled bottom plate 9 there is a strip 36 of, for example, EPDM, for example with the aid of contact welding, which involves pressing the strip against the edge of the profiled bottom plate at a certain pressure and temperature. This strip has the end of the sheet of film material 35 attached to it by means of, for example, a glued joint. The two sheets 34, 35 are welded to one another in a longitudinal weld 37 in a generally known manner.

Figure 6:
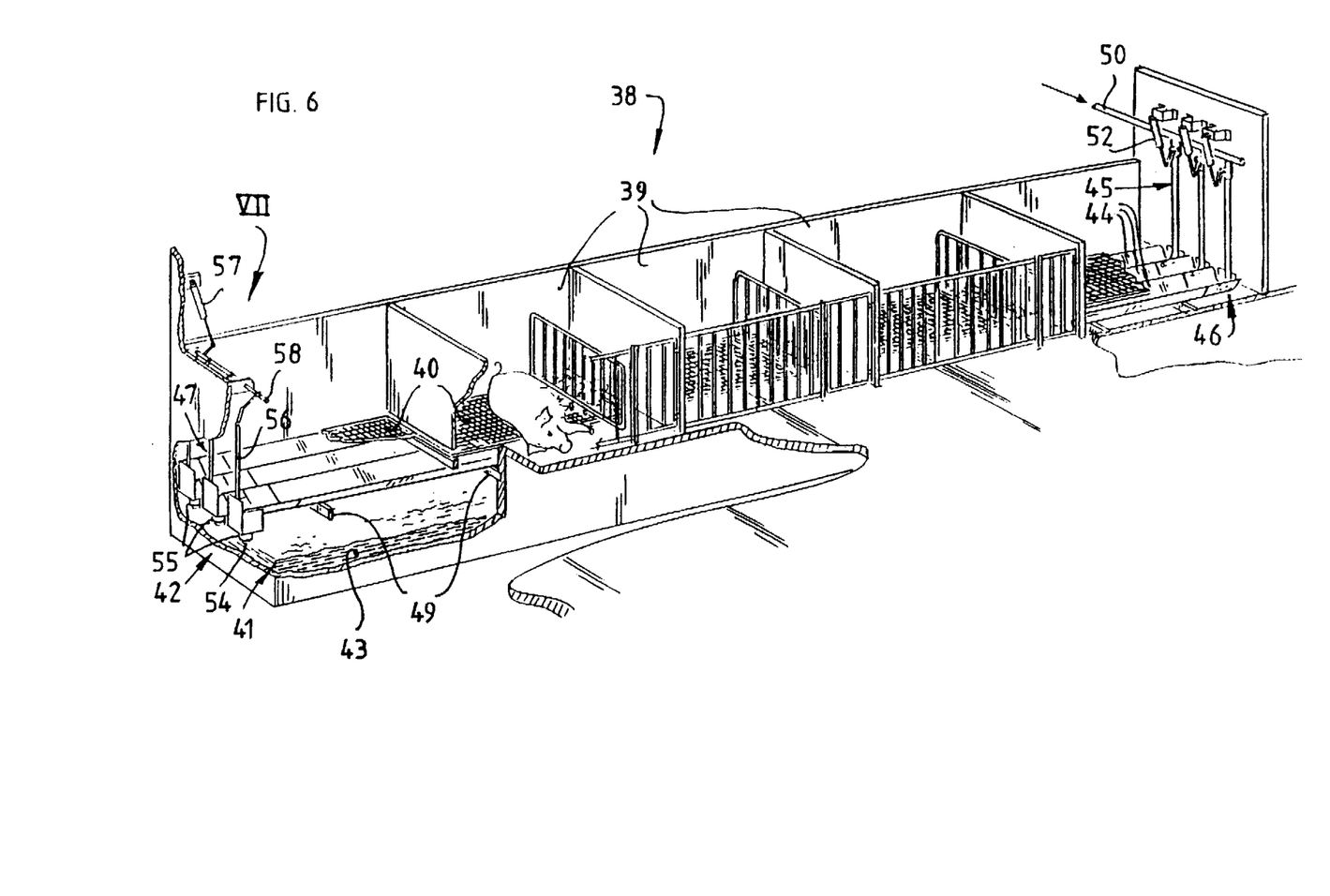
FIG. 6 shows a second possible embodiment of a stable according to the invention.

FIG. 6 shows a second possible pigsty 38 according to the invention which is composed of a number of boxes 39 with a sty grid 40. Between the sty grids 40 and the continuous slurry pit 41, a bottom plate 42 according to the invention is situated for removing manure 43. The bottom plate 42 in this case comprises four gutters 44 which are disposed next to one another so as to adjoin one another. Each gutter 44 is provided with means 45 for supply flushing liquid to each inlet gutter end and discharge means 47 at the level of the discharge gutter end 48 for discharging manure 43. The gutters 44 rest on joists 49. The supply means 45 comprise a supply pipe 51 which adjoins a supply line 50, via a valve 53 which can be operated pneumatically. The discharge means 47 comprise an outlet 55 which can be closed by a plug 54, the plug 54 being linked to a plug lifter 56 which is fixed to a common rod 58 which can be operated by means of a cylinder 57.

Figure 7:
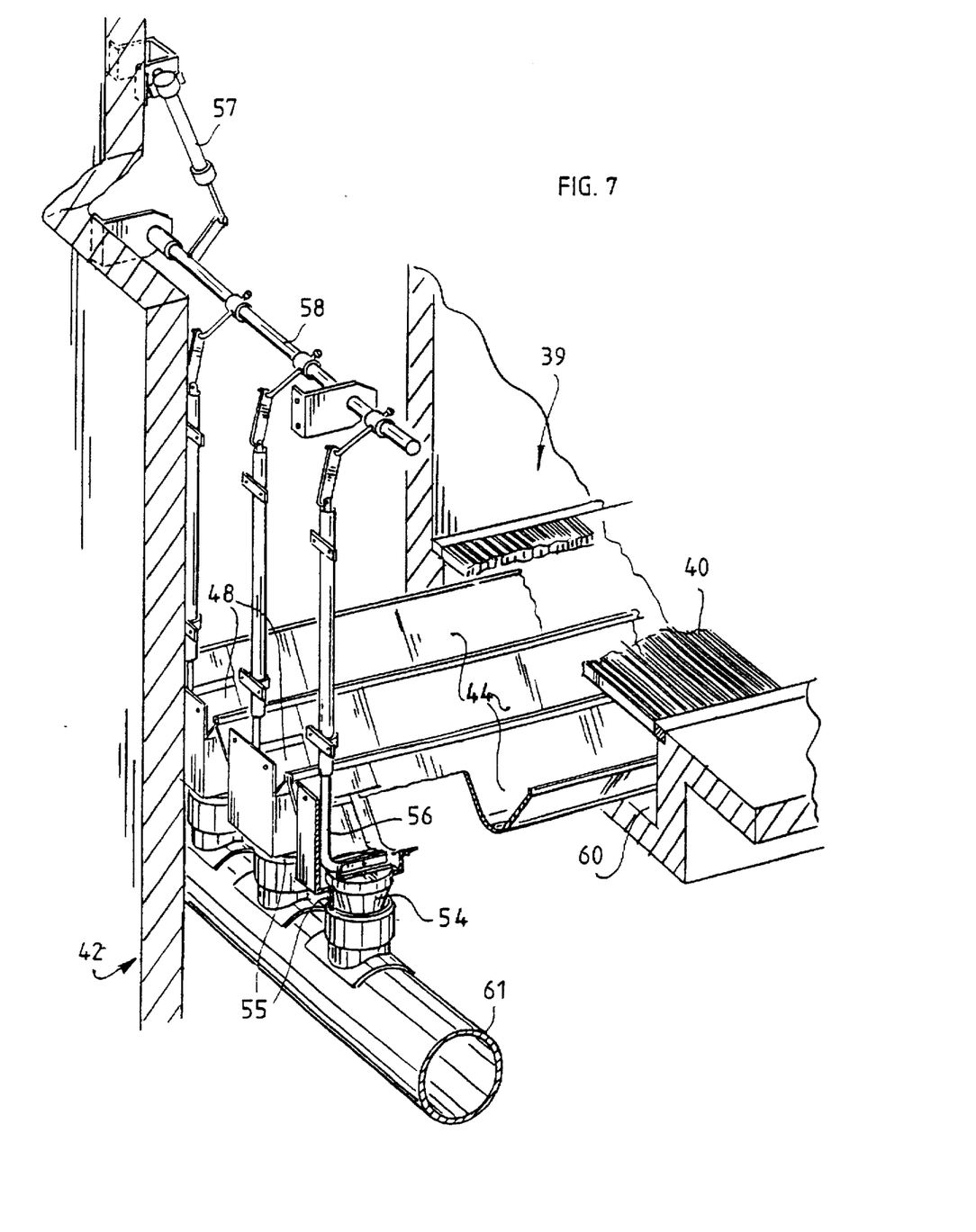
FIG. 7 shows detail VII from FIG. 6.

FIG. 7 shows the bottom plate 42 situated between a sty grid 40 and a trough 60. In this case, the manure is discharged via the outlet 55 to the central discharge pipe 61 which is joined to a manure reservoir.

Figure 8:
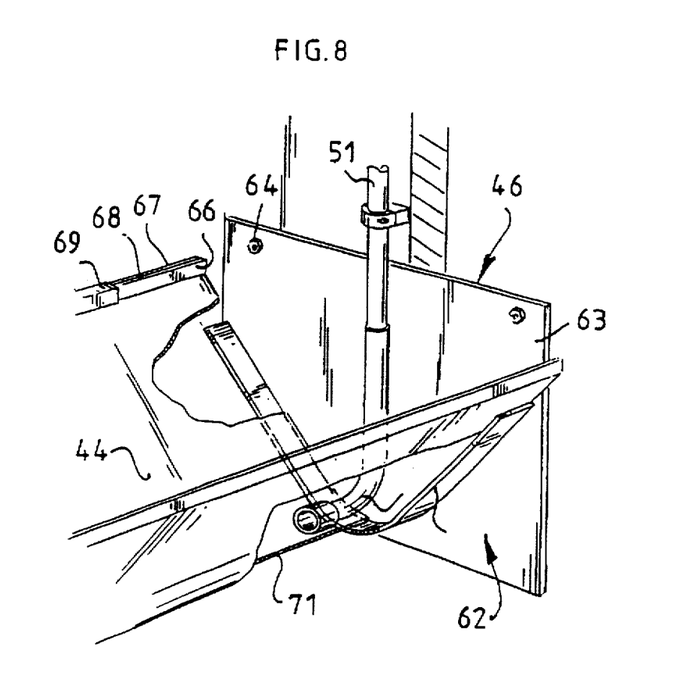
FIG. 8 shows a supply end of a bottom plate according to FIG. 6.

FIG. 8 shows the gutter inlet end 46. It can be clearly seen that the gutter 44 at the level of the gutter inlet end 46 is closed by a tailpiece 62 which comprises a wall plate 63 which is fastened to a wall by means of bolts 64 and is provided with a gutter support 65, on which the gutter rests and to which it is glued. It can further be clearly seen that adjoining gutters join one another by upright edges 66 and 67 which are spot-welded together by welds 68, while a covering strip 69 is disposed over the edges 66 and 67. Owing to the discharge pipe being provided with a curved extension 70 at the level of the round bottom 71, optimum flushing out of the gutter 44 is achieved.

It will be evident that as a result of the independent operation of the cylinders 52, each gutter 44 can be flushed through separately and, if required, each plug 55 of each gutter can be lifted and closed independently. In the situations shown, all the gutters can be flushed through simultaneously, in which case, just before the wave front of the flushing liquid approaches, the plugs 54 are lifted. Flushing can take place in various waves, a flushing time of a number of seconds to be chosen being observed, for example 15 seconds. The amount of flushing liquid can be chosen depending on the actual situation. This ensures that manure is collected and is removed intermittently, any emission of ammonia being avoided as far as possible, while the use of mechanical means for scraping clear the gutters 44 towards the outlet 55 is unnecessary.

We claim:

1. Stable (1) comprising a floor provided with an outlet for manure and urine to a collection chamber or pit (6) situated below a stable grid (2), which collection chamber is provided with a bottom (7) which is composed of, or covered by, a number of gutters (10) placed parallel to one another and each having two substantially straight side walls, a bottom surface and an open top end, the gutters forming a bottom plate (9) which covers the entire bottom of the pit, characterized in that the gutters (10) are V-shaped, having their side walls making an angle with each other, such that the bottom surface of each gutter (10) is narrowed with regard to the gutter's open top end, the respective gutters adjoining each other at the tops of the respective side walls.

2. Stable according to claim 1, characterized in that the walls of the gutters (10) form an angle with the horizontal, which is between about 45 degrees and about 80 degrees, the gutter at the underside having a radius of from 7 to 12 cm.

3. Stable according to claim 1 wherein the bottom plate (9) is composed of parts which overlap each other at the ends in the longitudinal direction of the gutters (10) and which are fastened to one another in a leakproof manner, by welding or gluing.

4. Stable according to claim 1 wherein the gutters (10) adjoin one another at the tops of the respective side walls with a rounding with a small radius of curvature.

5. Stable according to claim 1 wherein the pit (6) has walls (8) which are covered with a stretchable plastic film (13) which is attached both to the stable floor or the pit wall (8), and to the gutters (10), by being glued to or clamped into the edge of the gutter.

6. Stable according to claim 5 wherein the stretchable film is made of, polyethylene and in that there is attached to the bottom plate (9), near the edge (14) of the bottom plate, an edge of the stretchable film, by welding or gluing, and in that a second sheet (34) is attached to the wall of the pit and the two films are attached to one another, by welding.

7. Stable according to claim 1 wherein the gutters (10) are made of a chemically resistant plastic such as high-density polyethylene (HDPE).

8. Stable according to claim 1 wherein the bottom plate (9) is placed loosely on the floor of the pit, on supports, and is positioned so as to be free of the walls (8), by 5 centimeters, as a result of which the bottom plate, depending on the prevailing temperature, can expand and contract.

9. Stable according to claim 1 wherein the bottom is disposed in a leaktight manner and includes a thin metal strip, in order to enable checking the leaktightness after welding.

10. Method for flushing a stable (1), which stable comprises a floor or grid (2) on which animals can walk, and which walkable grid is provided with drainage holes (4) for the drainage of manure and urine to a collection chamber (6) such as a shallow pit, which is situated below the walkable grid and has a bottom (7), manure of animals present in the stable being collected in the collection chamber, after which the bottom is regularly flushed with a flushing liquid and the manure, together with the flushing liquid (11), is then discharged to a storage facility, in which storage facility the manure is separated, after a certain settling time, into a thick fraction and a thin fraction, after which the thin fraction is drawn off and is used as the flushing liquid to flush a bottom plate clean characterized in that the bottom of the collection chamber is covered with a bottom plate consisting of gutters (10), having said V-shape with two substantially straight side walls making an angle with having other, and in that after flushing a layer of the thin fraction remains standing on the bottom plate, so that the manure is collected therein.

* * * * *